Sept. 12, 1939.  T. H. DESPER  2,172,789
PAIL
Filed May 7, 1938
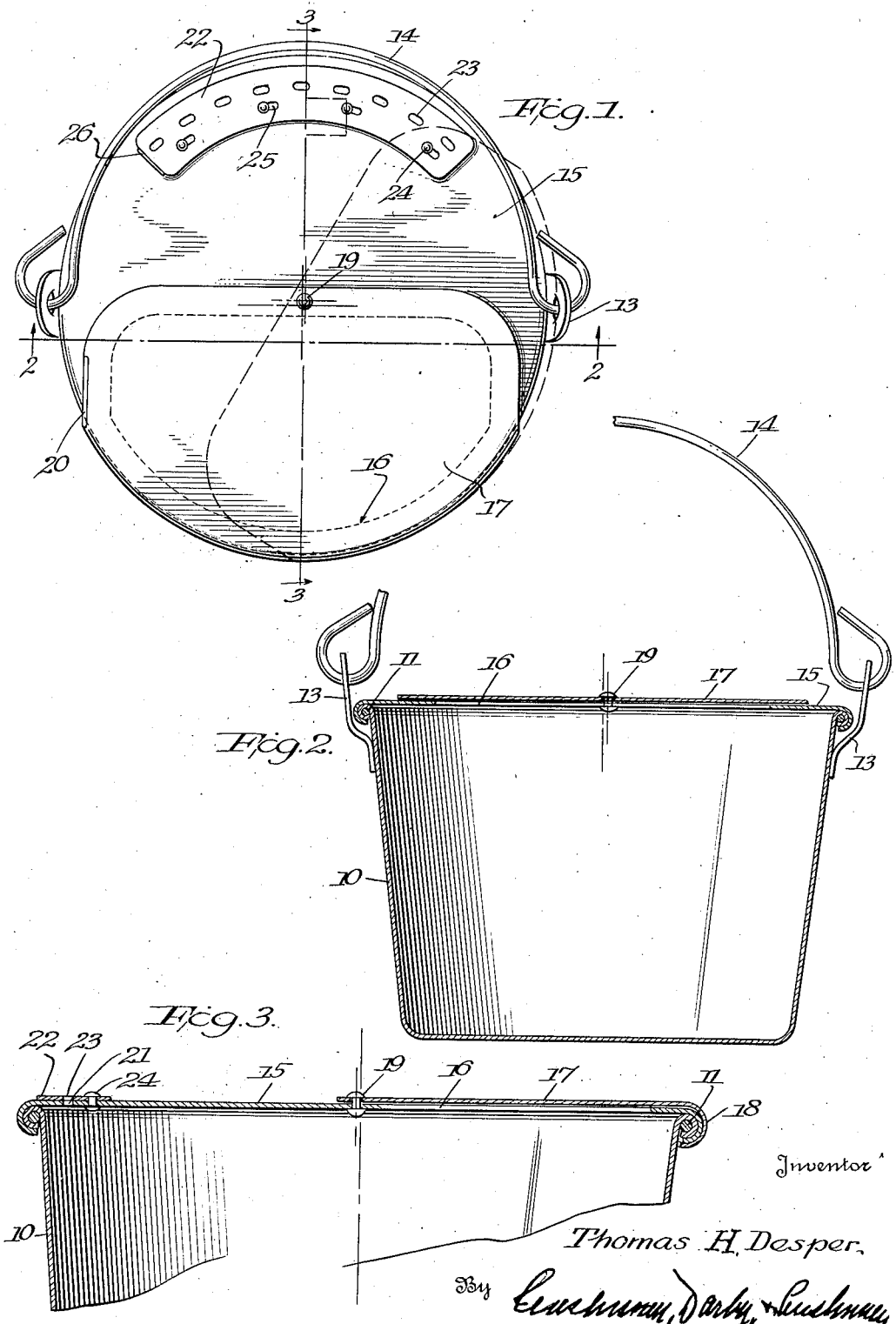
Inventor
Thomas H. Desper,
By Cushman, Darby & Cushman
Attorneys Patented Sept. 12, 1939

2,172,789

UNITED STATES PATENT OFFICE 2,172,789

PAIL

Thomas H. Desper, Keswick, Va.

Application May 7, 1938, Serial No. 206,675

5 Claims. (Cl. 220—30)

The present invention relates to covered pails or buckets.

An object of the invention is the provision of a pail having a permanently attached cover which is held in place by bending the edge of the cover over the rim of the pail.

A further object is to provide a pail cover having a spraying lid and a cover plate spaced from the lid and adapted to close a pouring opening in the cover.

Another object is the provision of a segmental cover plate pivoted off-center on the cover and provided with a curved bent-over rim engageable with the rim of the cover to lock the cover plate thereto when the latter is moved to a position to close the pouring opening.

A further object is to provide a cover construction having a slidable spraying lid and a pivoted cover plate circumferentially spaced from the lid, the pivotal connection between the cover and cover plate being such as to permit movement of the latter over the lid to allow the pouring opening to be fully exposed.

An advantage of the present invention is that the pail may be used for spraying liquid and for carrying or storing liquids, such as water or milk. Furthermore, the pail may be used to store seeds or other products. In this connection, the spraying lid may be adjusted to allow for ventilation purposes and at the same time, keep the material free of mice, insects and the like.

With the foregoing and other objects in view, the invention will now be more fully described, reference being had to the accompanying drawing in which:

Figure 1 is a top plan view of the pail and cover;

Figure 2 is a vertical section taken on line 2—2 of Figure 1, and

Figure 3 is an enlarged fragmentary section taken on line 3—3 of Figure 1.

Referring now to the drawing, the numeral 10 designates a pail or bucket which is preferably circular in horizontal cross-section. The upper edge of the pail is provided with a rounded bead or rim 11, and at diametrically opposite points are secured bail ears 13 by which a handle 14 is connected to the pail in the usual manner. It will be observed, however, that the ears 13 are bent outwardly so as to be definitely spaced from the bead 11 (see Figure 2). This is to permit attachment of a sheet metal cover 15 to the bead or rim as well as a cover plate (to be presently described). The cover is permanently secured to the pail by bending its marginal portions over the bead or rim, as clearly shown in Figure 2.

The cover 15 is provided with a segmental opening 16 which encompasses substantially one-half of the area of the cover and provides an adequate pouring opening when the pail is to be used in the usual manner, such as for carrying water or milk. In order to close the opening against the entrance of dust, insects or the like, a segmental cover plate 17 is provided which is of larger size than the opening 16, and when in closed position (see full line construction of Figure 1) entirely seals and closes the opening 16. The cover plate has a curved rounded outer edge 18 which conforms substantially to the curvature of the rim of the cover and overlies and contacts the same when the cover plate is in closed position. Furthermore, and as clearly shown in the drawing, the cover plate is pivoted to the cover adjacent the inner edge of the cover plate, by a stud 19. This pivot point is slightly off-center with respect to the cover plate. That is, the cover plate is eccentrically and pivotally mounted on the cover plate. This permits the cover plate to be readily rotated from its closed position, shown in full lines in Figure 1, to its dotted line open position in which the opening 16 is entirely exposed to permit the introduction or discharge of liquid or other materials.

With this construction, and by reason of the off-center position of the pivot of the cover plate, the latter will be securely locked in closed position because of the camming action of the rounded portion 18 with respect to the rim of the cover. When it is desired to move the cover plate to open position, it is merely necessary to grasp the upstanding lug 20 and move the plate about its pivot. This will have the effect of gradually moving or spacing the curved portion 18 of the cover plate from the rim of the cover whereby the cover plate is free to move to open position. It is to be understood that the outward movement of the curved edge of the cover plate from the rim of the cover is very slight and that the bail ears 13 are sufficiently spaced from the wall of the pail to provide clearance for the curved portion 18 as the cover plate is swung to its open position.

In addition to the pouring opening 16, the cover 15 is provided with a plurality of spaced holes 21 preferably diametrically spaced from the opening 16. A spraying lid or second cover plate 22 of arcuate formation is provided with a plurality of spaced openings or holes 23 which are adapted to register with the holes 21 in the cover. Any suitable means, such as the studs 24 secured to the cover 15 and a second set of elongated openings 25, may be provided to anchor the spraying lid 22 to the cover and permit sliding movement of the lid on the cover to bring the openings or holes 21 and 23 into register. It is to be observed that these holes are elongated so that the lid 22 may be adjusted to either partially or fully cover the holes 21 and thereby restrict the spraying action of the lid. It is to be further understood that the lid 24 is frictionally held on the cover in each of its adjusted positions. A finger engaging arm 26 projects upwardly from one end of the lid and constitutes a handle for sliding the lid to any of its adjusted positions, as desired.

Referring to Figures 2 and 3, it is to be observed that the pivotal connection 19 between the cover plate 17 and the cover 15 is such as to permit a slight spacing of the plate 17 with respect to the cover. This arrangement allows the cover plate 17 to ride over the top of the spraying lid 22 so that it may be moved to its full open position. In this connection, when the cover plate has reached the dotted line position of Figure 1, the rounded portion 18 of the plate will be spaced sufficiently from the rounded marginal portion of the cover 15 to permit the cover plate to be raised and thereby clear the spraying lid 22. If desired, the adjacent end of the spraying lid may be beveled or tapered to facilitate movement of the cover plate over the lid. It will thus be observed that there is a coaction between the spraying lid and the cover plate which permits the lid to be used when the cover plate is closed and allows the cover plate to be moved to full open position over the lid when it is desired to pour liquid into or from the pail.

With the construction as above described, it will be apparent that the present invention may be used for many different purposes. For instance, it may be used in the usual manner, such as for carrying water, milk, or other liquids. In this connection, the liquid may be readily introduced into the large opening 16 and if desired, may be stored against contamination by dust or insects by completely closing the cover plate and spraying lid. If it is desired to use the pail as a spraying implement, this may be easily accomplished, and by sliding the lid 22, the spraying holes may be adjusted to the desired size.

The present invention may also be used for storing other materials, such as seeds, and by closing the cover plate 17 and moving the lid to completely close the holes 21, the contents will be adequately sealed against mice or the like. Furthermore, if it is desired to store any material which needs slight ventilation, this may be easily accomplished by adjusting the spraying lid to a position where the holes 21 and 23 may register sufficiently to permit access of air but which will otherwise seal the contents.

It is to be understood that the present invention may be used for many other purposes than those above enumerated. Furthermore, it is to be understood that the invention is not limited to the details of construction shown in the drawing and described in the specification, and that the example of the use of the device which has been given does not include all the uses of which it is capable; also, that the phraseology employed in the specification is for the purpose of description and not of limitation.

I claim:

1. The combination with a pail having a beaded edge, and a cover for said pail having its edge bent over the rim of the pail to permanently secure the cover to the pail, said cover being provided with a segmental pouring opening spaced inwardly from the edge of the pail, and a segmental cover plate eccentrically and pivotally mounted on the cover and movable into position to completely cover the segmental pouring opening, the pivot point of said cover plate being offset slightly from the center of the cover, said cover plate having a curved, bent-over rim engageable with the rim of the cover to lock the cover plate thereto when the cover plate is moved about its pivot to a position to close the segmental pouring opening.

2. A pail having a cover permanently secured thereto and provided with a circumferential rounded bead, said cover having a segmental pouring opening, and a cover plate eccentrically and pivotally mounted on the cover and movable into position to completely cover the pouring opening, the pivot point of said cover plate being offset slightly from the center of the cover, said cover plate having a curved, bent-over rim engageable with the circumferential rim of the cover to lock the cover plate to the cover when the cover plate is moved about its pivot to a position to close the segmental pouring opening.

3. A cover adapted to be permanently secured to a pail having a beaded rim, said cover having a segmental pouring opening spaced inwardly from the edge of the cover, and a segmental cover plate eccentrically and pivotally mounted on the cover and movable into position to completely cover the segmental pouring opening, the pivot point of said cover plate being offset slightly from the center of the cover, the outer edge of the cover plate being adapted to be bent over to form a rim engageable with the edges of the cover to lock the cover plate thereto when the cover plate is moved about its pivot to a position to close the segmental pouring opening.

4. A pail having a cover provided with a segmental pouring opening, a segmental cover plate eccentrically and pivotally mounted on the cover and movable into position to completely cover the segmental pouring opening, the pivot point of said cover plate being offset slightly from the center of the cover, means on said cover plate cooperating with the cover to lock said plate to the cover when the cover plate is moved to a position to close the pouring opening, said cover having an opening therein opposite said segmental pouring opening and provided with a cover plate positioned in the path of movement of the first mentioned cover plate, said first mentioned cover plate being loosely mounted on the cover at the pivot, the pivotal connection between the cover and first mentioned cover plate rendering the locking means inoperative as the said cover plate approaches the second cover plate, said loose pivotal connection permitting a slight lifting movement of the first mentioned cover plate whereby the latter may be moved over the second cover plate to fully expose the segmental pouring opening.

5. A pail having a cover permanently secured thereto and provided with a circumferential rounded bead, said cover having a segmental pouring opening, a segmental cover plate eccentrically and pivotally mounted on the cover and movable into position to completely cover the segmental pouring opening, the pivot point of said cover plate being offset slightly from the center of the cover, said cover plate having a rounded bent-over rim engageable with the rounded bead of the cover to lock the cover plate thereto when the latter is moving to a position to close the pouring opening, said cover having an opening therein opposite said segmental pouring opening and provided with a cover plate positioned in the path of movement of the first mentioned cover plate, said first mentioned cover plate being loosely mounted on the cover at the pivot, the pivotal connection between the cover and first mentioned cover plate being arranged to permit the curved rim of the cover plate to clear the rounded bead of the cover as said first mentioned cover plate approaches the second cover plate, said loose pivotal connection permitting a slight lifting movement of the first cover plate whereby the latter may be moved over the second cover plate to fully expose the pouring opening.

THOMAS H. DESPER.